United States Patent [19]
Shirai

[11] Patent Number: 5,746,559
[45] Date of Patent: May 5, 1998

[54] SELF-LOCKING NUT HAVING DIVIDED AND UNDIVIDED CIRCUMFERENTIAL PORTIONS

[75] Inventor: Katutada Shirai, Shizuoka, Japan

[73] Assignee: Koito Manufacturing Co., Ltd., Tokyo, Japan

[21] Appl. No.: 665,683

[22] Filed: Jun. 18, 1996

[30] Foreign Application Priority Data

Jun. 28, 1995 [JP] Japan .................................. 7-183246

[51] Int. Cl.$^6$ .................................................. F16B 37/04
[52] U.S. Cl. ........................... 411/182; 411/437; 362/421
[58] Field of Search ................................. 411/437, 182, 411/60, 55, 307, 263; 362/421

[56] References Cited

U.S. PATENT DOCUMENTS

| | | |
|---|---|---|
| 4,503,486 | 3/1985 | Makita . |
| 4,657,458 | 4/1987 | Woller ..................................... 411/437 |
| 5,003,436 | 3/1991 | Yamada ................................... 362/421 |
| 5,139,380 | 8/1992 | Reynolds ................................. 411/437 |

FOREIGN PATENT DOCUMENTS

| | | | |
|---|---|---|---|
| 707819 | 4/1954 | United Kingdom | ................... 411/182 |

*Primary Examiner*—Flemming Saether
*Attorney, Agent, or Firm*—Sughrue, Mion, Zinn, Macpeak & Seas, PLLC

[57] ABSTRACT

A self-locking nut fitted into a fitting hole of a reflector with which an aiming screw engages for adjusting an inclination angle of a reflector of a vehicular lamp, the self-locking nut comprising: a nut leading portion having slits extending in radius direction; a flange arranged below said nut leading portion; a fitting portion formed below said flange, said fitting portion having slits extending in radius direction and a pair of legs for fitting into the fitting hole of the reflector, said pair of legs being elastically expandable and having a wedge shape; a shaft hole having an inner surface, said shaft hole passing through the nut leading portion, the flange and the fitting portion in vertical direction; and a threaded portion formed on the inner surface of said shaft hole engageable with the aiming screw, the threaded portion comprising: first grooves extending from said slit of said fitting portion; second grooves positioned perpendicular to said slit of said fitting portion; a divided circumferential portion divided in the circumferential direction by said first and second grooves; and an entire circumferential portion having a circular shape in section, said entire circumferential portion being positioned at said fitting portion, wherein a pitch diameter of said entire circumferential portion being slightly smaller than that of the aiming screw.

13 Claims, 4 Drawing Sheets

(I-I)

(II-II)

SELF-LOCKING NUT HAVING DIVIDED AND UNDIVIDED CIRCUMFERENTIAL PORTIONS

BACKGROUND OF THE INVENTION

The present invention relates to an aiming device for adjusting an optical axis of a vehicle lamp. More particularly, the invention relates to a self-locking nut which engages with an aiming screw for tilting a reflector of the lamp.

An aiming device for adjusting an optical axis, as shown in FIG. 2, is constituted such that a reflector 3, which is accommodated within a lamp chamber defined by a lamp body 1 and a front lens 2 attached to a front opening of the lamp body 1, is tiltable with respect to the lamp body 1. The aiming device is provided with a ball joint 4 serving as a fulcrum disposed on the reflector 3 for tiltably supporting the reflector 3 together with a lamp bulb 10 on the lamp body. The ball joint 4 has a ball receptacle member 5 fitted in a bracket 3a provided on the reflector 3 and a ball bolt 6 extending from the lamp body 1. A vertical and horizontal aiming adjustment sections are arranged in the vertical and horizontal directions, respectively, with respect to the ball joint 4.

As shown in FIG. 2, a vertical aiming adjustment section 7 includes, for instance, a self-locking nut 8 attached to a bracket 3b extending from a back side of the reflector 3, and confronting therewith an aiming screw 9 rotatably supported on the lamp body 1. The aiming screw 9 engages with the self-locking nut 8. When the aiming screw 9 is operated to screw externally from the lamp body 1, the reflector 3, together with the self-locking nut 8 engaging with the aiming screw 9, is moved in the axial direction of the aiming screw 9. Therefore, the reflector 3 is tilted in the vertical direction around the ball joint 4 serving as the fulcrum, so that the optical axis of the lamp bulb 10 is vertically adjusted.

There have been proposed the self-locking nuts thus constructed as shown in FIG. 6A and disclosed by, for instance, Unexamined Japanese Utility Model Application No. Hei. 6-64305 or as shown in FIG. 6B and disclosed by, for instance, Post-examined Japanese Utility Model Publication Hei. 6-45050, which can be used as self-locking nut 8 of FIG. 2.

Both proposed self-locking nuts 101 and 201 shown in the FIGS. 6A and 6B, which replace self-locking nut 8 of FIG. 2, are formed of resin. The self-locking nut 101 is formed with a shaft hole 102 at the center thereof, into which the aiming screw is inserted. At an end portion, the self-locking nut 101 is formed with a fitting portions 103 having a pair of legs to be fitted with a fitting hole formed in the bracket of the reflector 3 in order to secure the nut to the bracket. The threaded portion 104 is provided on an inner surface of the shaft hole 102, and the aiming screw 9 engages with the threaded portion 104.

In the nut 101 thus constructed, as the aiming screw is screwed to the fitting portion 103 after the aiming screw 9 is inserted into the threaded hole 104, a distance between the pair of legs of the fitting portion 103 expands according thereto. Therefore, the fitting portion 103 is surely fitted with the fitting hole of the bracket 3b, so that there is no clearance between the nut 101 and the bracket 3b.

The self-locking nut 201 is similar to the self-locking nut 101. That is, the self-locking nut 201 has a shaft hole 202 at the center thereof, into which the aiming screw is inserted. At an end portion, the self-locking nut 201 has a fitting portion 203 having a pair of legs to be fitted with a fitting hole formed on the bracket of the reflector 3 in order to secure the nut to the bracket 3b. The threaded portion 204 is provided on an inner surface of the shaft hole 202, and the aiming screw 9 engages with the threaded portion 204.

In the nut 201 thus constructed, as the aiming screw 9 engages with the threaded hole 204 and the aiming screw is screwed into the fitting portion 203, the distance between the pair of legs of the fitting portion 203 expands. Therefore, the fitting portion 203 is surely fitted with the fitting hole of the bracket 3b, so that there is no clearance between the nut 201 and the bracket 3b.

In the proposed self-locking nut 101, for instance, as shown in FIG. 6A, the shaft hole 102 into which the aiming screw is inserted has a circular shape in section having a constant diameter over substantially the entire length thereof in the axial direction. Accordingly, it would suffer from a problem in that a contact area between the aiming screw 9 and the threaded portion 104 formed on the inner surface of the shaft hole 102 becomes large, so that a frictional force between the aiming screw 9 and the threaded portion 104 is large. As a result, a large operative force is required to rotate the aiming screw 9, that is, the adjusting operation is difficult to perform.

To the contrary, because the nut 201 as shown in FIG. 6B has a slit or groove 205 extending along the shaft hole 202, a total length in the circumferential direction of the inner surface of the hole 202 is relatively small. Therefore, an area of the threaded portion 204 is reduced, that is, a contact area between threaded portion 204 and the aiming screw 9 is decreased to the extent of the slit or groove 205. As a result, the frictional force is reduced, so that the operative force required can be relatively small.

With the nut 201 of FIG. 6B, however, since the contact area of the threaded portion 204 contacting with the aiming screw 9 is reduced, an elastic force of the nut concentrates on such contact area. Accordingly, a contact pressure generated between the aiming screw 9 and the threaded portion 204 increases, so that the aiming screw 9 tends to dig into the threaded portion 204. Therefore, the pair of legs of the fitting portion 203 do not sufficiently expand outwardly when the aiming screw 9 is screwed into the nut 204. As a result, an undesirable gap defined between the fitting hole of the bracket 3b and the fitting portion 203 still remains, and the nut 201 is not secured to the bracket 3b. This contributes to an error in accuracy of the aiming adjustment and deteriorate the required precision of the adjustment.

SUMMARY OF THE INVENTION

The present invention was made in view of the foregoing problems or difficulties accompanying the proposed self-locking nut. Therefore, an object of the present invention is to provide a self-locking nut in which an operative force for an aiming adjustment can be reduced while an undesirable gap defined between the self-locking nut and a part of a lamp body can be suppressed.

To achieve the above-mentioned and other objects, there is provided a self-locking nut in which a threaded portion formed on an inner surface of a shaft hole which, according to the present invention, includes an entire circumferential portion having a circular shape in section and a divided circumferential portion divided in the circumferential direction by plural grooves.

A contact area between the entire circumferential portion and a screw engaged therewith becomes relatively large, that is, a contact pressure generated at the contact area is reduced, so that a dig of the screw into the threaded portion is suppressed. Therefore, a pair of legs are allowed to sufficiently expand outward. On the other hand, a contact area between the divided circumferential portion and the screw becomes relatively small, that is, a frictional force between these members can be reduced, so that the operative force for driving the screw is reduced. As the areas of the entire and divided circumferential portions are appropriately arranged, the operative force of the screw can be reduced as well as the undesirable gap can be suppressed in fitting condition.

DETAILED DESCRIPTION OF THE PREFERRED EMBODIMENTS

The present invention will now be described with referring to the accompanying drawings.

Figure 1:
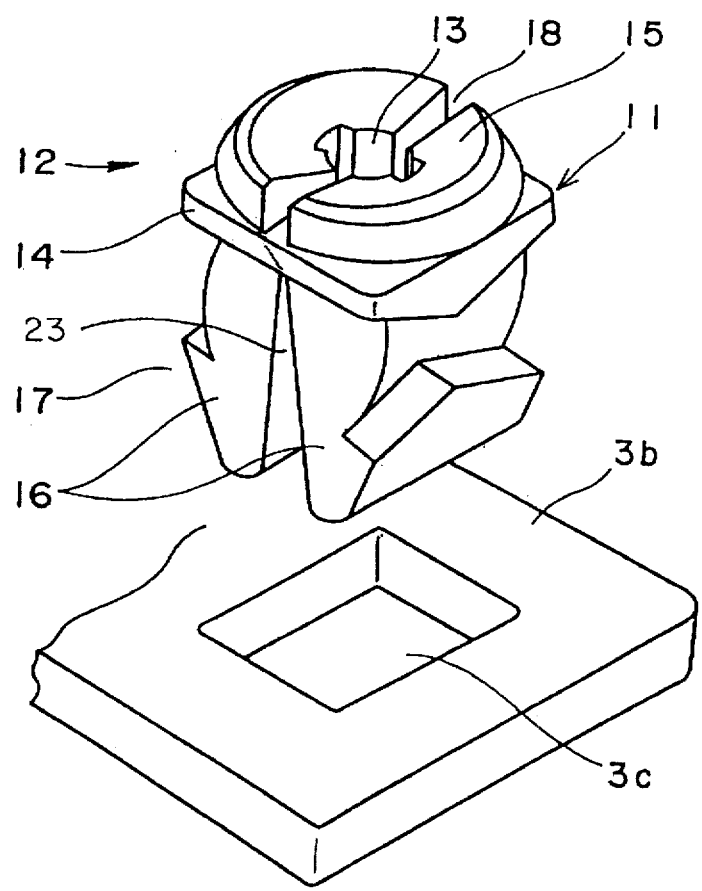
FIG. 1 shows an external perspective view of a self-locking nut according to the present invention.

FIG. 1 is an external perspective view showing a self-locking nut 11 according to the present invention. In this embodiment, the nut 11 may be applied instead of the locking nut 8 of the aiming adjustment section 7 provided with the reflector 3 of the lamp as shown, for example, in FIG. 2. The nut 11 is fitted into a rectangular fitting hole 3c formed on a bracket 3b integrated with a back side of the reflector 3 and is secured to the bracket 3b, as shown in FIG. 1.

FIGS. 3A to 3D respectively show a plan view, a front view, a cross sectional view of line I—I, and a cross sectional view of line II—II of the nut 11. The nut 11 is formed with a rectangular body 12 slightly elongated in a vertical direction and is made from resin, where the vertical direction is defined as a reference as indicated in FIG. 1, wherein the vertical direction is the direction of the axis of a shaft hole 13. The shaft hole 13 is formed at the center of the body 12 so as to pass through the body 12 in the vertical direction. An upper part of the nut 11 includes the body 12 which is formed with a flange portion 14 having a square shape, and a nut leading portion 15 having a circular shape which is formed on an upper part of the flange portion 14. A middle portion is arranged right below the flange portion 14 such that a length in an axial direction of which is substantially the same as a thickness of the bracket 3b. A lower part lower than the middle portion has a fitting portion 17 comprising a pair of wedge shaped legs.

A slit 18 extending in a radial direction runs from the nut leading portion 15 to an upper surface of the flange portion 14. A tapered slit 23 formed under the flange portion 14 defines the pair of legs 16 at the fitting portion 17. When the fitting portion 17 is inserted into the fitting hole 13c, the fitting portion 17 is elastically deformed such that the legs 16 come close to each other in order for its external size to be smaller, and then the fitting portion 17 is passed through the fitting hole 3c. After that, the fitting portion 17 releases from the elastic deformation, and steps at a boundary between the middle portion and wedge portions is locked at an inner edge of the fitting hole 3c. Accordingly, the nut 11 maintains in locking state with respect to the fitting hole 3c.

Figure 4:
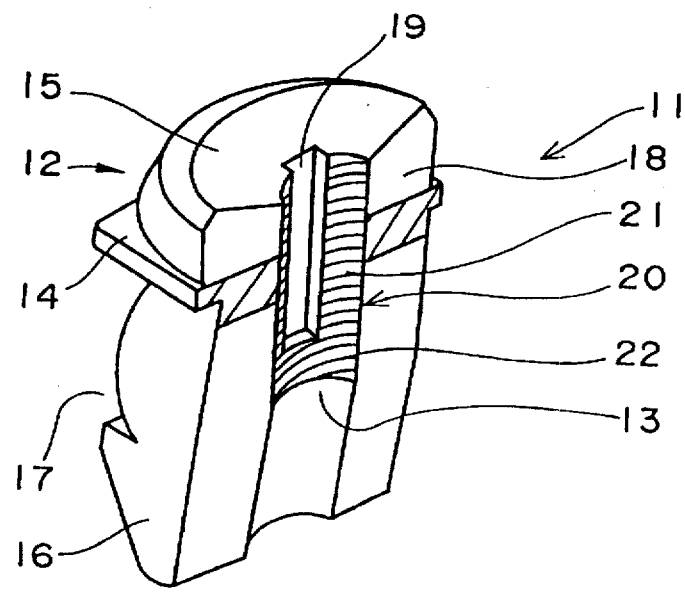
FIG. 4 is an expanded perspective view of the nut with cutting in part.
Figure 2:
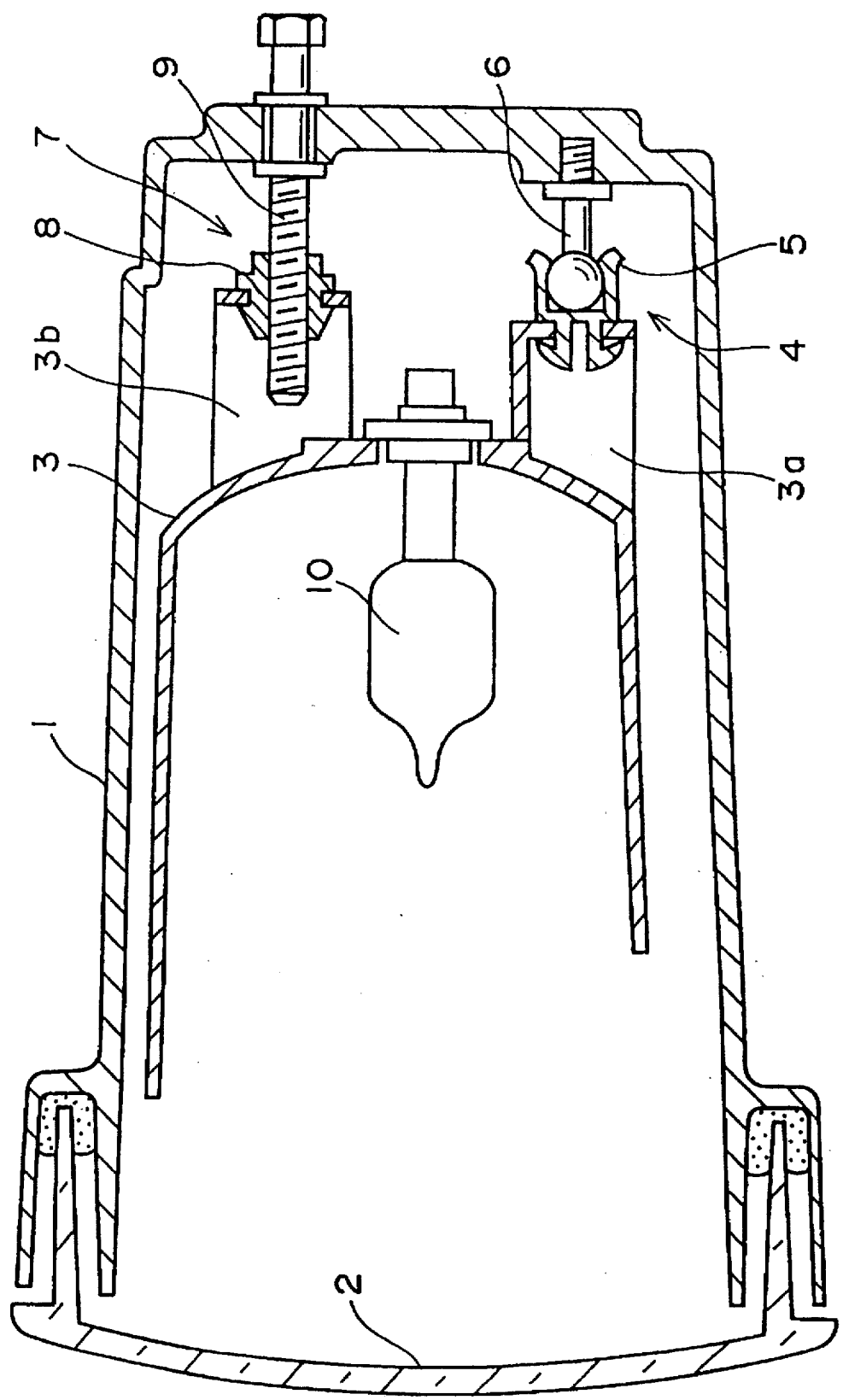
FIG. 2 shows cross sectional view of a lamp to which the self-locking nut of the invention is applied.
Figure 3A:
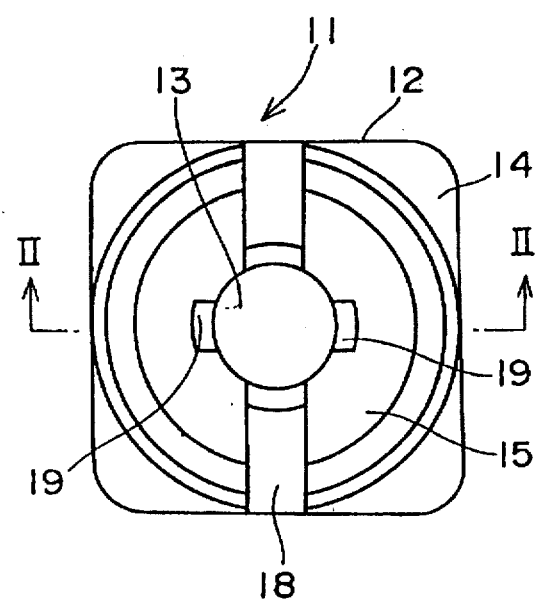
FIGS. 3A to 3D respectively show a plan view, a front view, a cross sectional view of line I—I, and a cross sectional view of line II—II of the nut of FIG. 1.
Figure 3C:
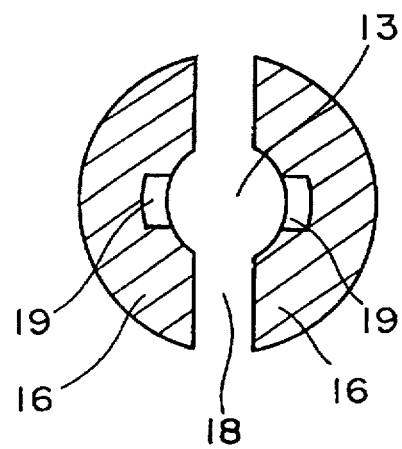
Figure 3B:
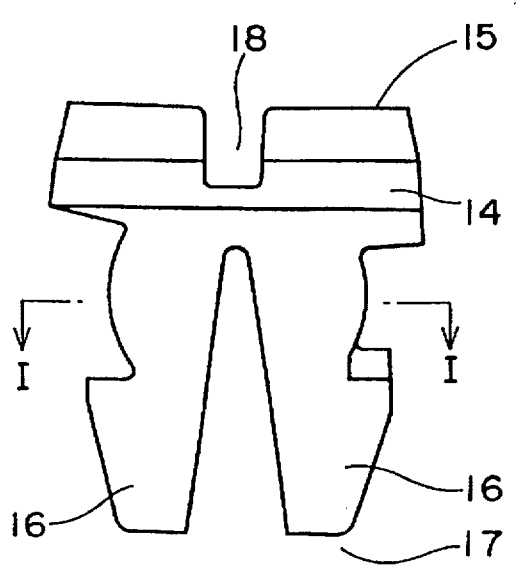
Figure 3D:
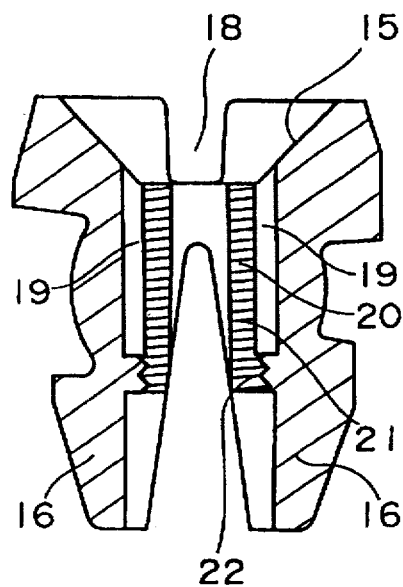
Figure 5:
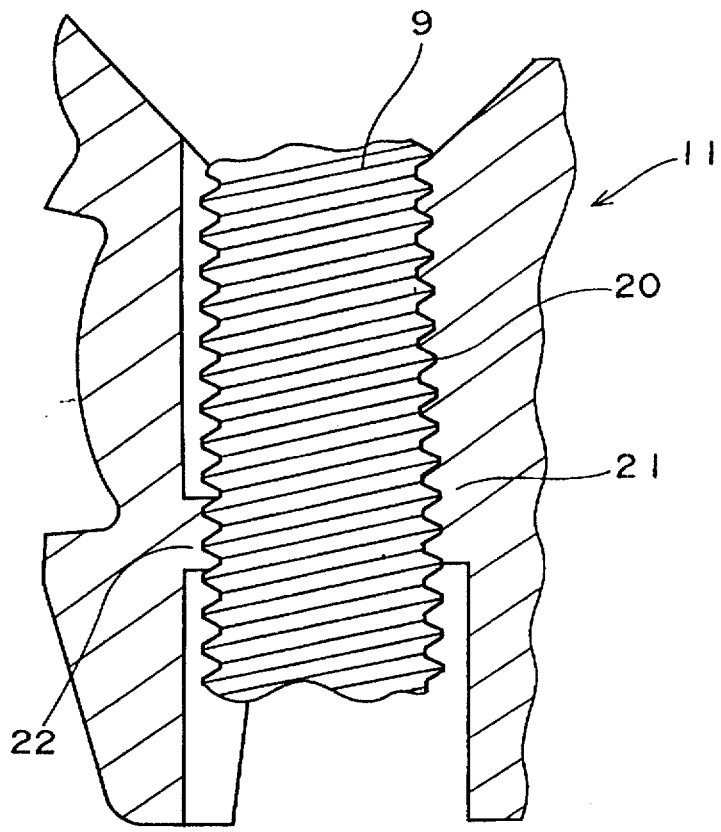
FIG. 5 is an expanded cross sectional view of the nut in condition that the screw is engaged with the nut.
Figure 6A:
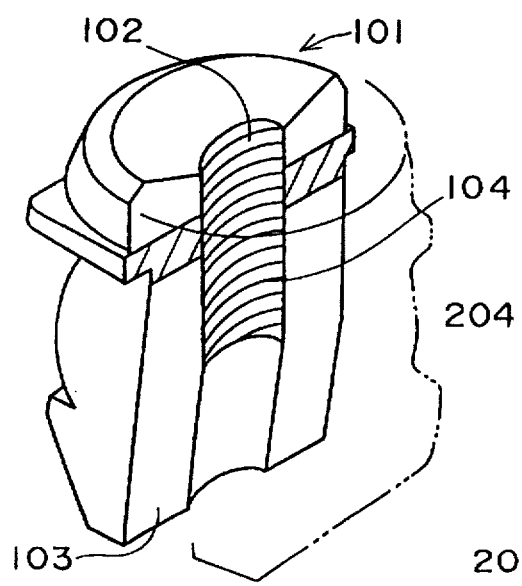
FIGS. 6A and 6B are perspective views showing conventional self-locking nuts.
Figure 6B:
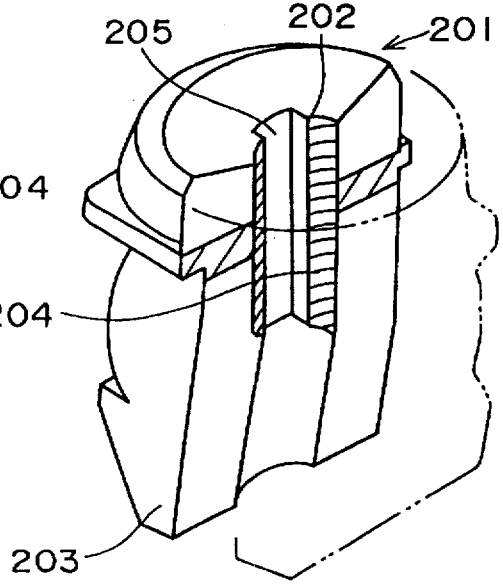

As shown in FIG. 4, the nut leading portion 15 provided at the upper part of the flange portion 14 is in the form of a conical surface along a peripheral edge of the shaft hole 13 so that the conical surface correctly guides a tip of the aiming screw 9, as shown in FIG. 2, into the shaft hole 13. At two circumferential positions extending from the slit 18 and two circumferential positions perpendicular to the slit 18, U-grooves extend in the axial direction from the nut leading portion 15 to a middle of the fitting portion 17. Accordingly, because of the U-grooves 19, the inner surface of the shaft hole 13 remains only between these U-grooves 19.

On the contrary, the U-grooves 19 do not run under the middle of the fitting portion 17, and the inner surface of the shaft hole 13 still remains over the entire circumference. A screw thread is formed at the inner surface thus remaining, for serving as the threaded portion 20. In other words, the threaded portion 20 is formed thereon with a divided circumferential portion 21 divided by the U-grooves in the circumferential direction and an undivided circumferential portion 22 having threads along the entire circumference of each leg 16 of the fitting portion 17. A pitch diameter of the entire circumferential portion 22 is slightly smaller than that of the aiming screw 9.

In this embodiment, while the fitting portion 17 of the nut 11 is fitted in the fitting hole 3c of the bracket 3b, the tip of the aiming screw 9 is guided into the shaft hole 13 in use of the nut leading portion 15 and engaged with the threaded portion 20. In this condition, since the aiming screw 9 is inserted into the shaft hole 13 and engaged with the threaded portion 20, the legs 16 are expanded outwardly to the extent of the difference between the pitch diameters at the entire circumferential portion 22. Therefore, an outer surface of the legs 16 is secured to the inner edge of the fitting hole 3c, so that the undesirable gap is suppressed.

In this embodiment, the entire circumference of inner surface of the shaft hole 13 remains at the entire circumferential portion 22. The contact pressure generated between the aiming screw 9 and the threaded portion 22 is distributed to the entire circumference, so that the contact pressure generated therebetween is reduced. Therefore, a dig of the aiming screw 9 into the entire circumferential portion 22 of the shaft hole 13 can be suppressed. The problem that the legs of the nut are urged inwardly because the digging action is prevented. Especially, since the entire circumferential portion 22 is positioned at a substantially middle position of the fitting portion 17 with respect to the vertical direction, digging is suppressed and the problem of inwardly urging the leg 16 is effectively avoided.

In addition, because the divided portion 21 is formed by the U-grooves 19 on the inner surface of the shaft hole 13 of the nut 11, the contact area generated between the aiming screw 9 and the threaded portion 20 can be reduced to the extent of the area of the U-grooves 19 cut the circumference. Therefore, the frictional force produced between the aiming screw 9 and the threaded portion 20 can be reduced, and the relatively small operative force is sufficient to operate the aiming screw.

In this embodiment, the entire circumference of the inner surface of the shaft hole 13 remains at the entire circumferential portion 22. In order to prevent the aiming screw from digging into the self-locking nut, it is sufficient that the contact area between the threaded hole and the aiming screw becomes relatively large. Accordingly, a small part of the circumference is removed, instead of remaining the entire circumference. As the axial length of the entire circumferential portion 22 is suitably changed, the contact pressure generated between the threaded hole 204 and the aiming screw 9 may be set at a desired value.

As described above, the present invention provides a self-locking nut in which a threaded portion formed on an inner surface of a shaft hole includes an entire circumferential portion having a circular shape in section and a divided circumferential portion divided in the circumferential direction by plural grooves. A contact area between the entire circumferential portion and a screw engaged therewith becomes relatively large, that is, a contact pressure at the contact area is reduced, so that digging of the screw into the threaded portion can be suppressed. Therefore, a pair of legs can sufficiently expand outward.

On the other hand, a contact area between the divided circumferential portion and the screw becomes relatively small, that is, a frictional force between them is reduced, so that the operative force of driving the screw is reduced. As the areas of the entire and divided circumferential portions are appropriately arranged, the operative force of the screw can be reduced as well as the undesirable gap can be suppressed in fitting condition.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A self-locking nut for fitting into a fitting hole of a reflector of a vehicle lamp, and engaging with an aiming screw for adjusting an inclination angle of the reflector, the self-locking nut comprising:

a body for receiving the aiming screw;

a fitting portion formed below said body, for fitting into the fitting hole of the reflector, wherein said fitting portion comprises a pair of legs, each of said legs having a wedge shape, and said pair of legs being elastically expandable;

a shaft hole having an inner surface, said shaft hole passing through said body and said fitting portion in a vertical direction; and a threaded portion formed on the inner surface of said shaft hole, for engaging with the aiming screw, said threaded portion comprising:

a groove extending along said inner surface of said shaft hole from said fitting portion through said body, a divided circumferential portion divided in a circumferential direction thereof by said groove; and an undivided circumferential portion disposed below said groove, wherein said threaded portion is undivided in the circumferential direction by said groove.

2. The self-locking nut according to claim 1, wherein said self-locking nut is made from resin.

3. The self-locking nut according to claim 1, wherein a pitch diameter of said undivided circumferential portion is slightly smaller than that of the aiming screw.

4. The self-locking nut according to claim 3, wherein said undivided circumferential portion is arranged at the fitting portion.

5. The self-locking nut according to claim 1, wherein said threaded portion has plural grooves for dividing the divided circumferential portion.

6. A self-locking nut for fitting into a fitting hole of a reflector of a vehicular lamp with which an aiming screw engages for adjusting an inclination angle of the reflector, the self-locking nut comprising:

a nut leading portion having slits extending in a radial direction;

a flange formed below said nut leading portion;

a fitting portion formed below said flange, said fitting portion having slits extending in a radial direction and a pair of legs for fitting into the fitting hole of the reflector, said pair of legs being elastically expandable and each of said legs having a wedge shape;

a shaft hole having an inner surface, said shaft hole passing through the nut leading portion, the flange and the fitting portion in a vertical direction; and a threaded portion formed on the inner surface of said shaft hole engageable with the aiming screw, the threaded portion comprising:

a first groove extending along said shaft hole from said slits of said fitting portion through said nut leading portion; a divided circumferential portion divided in the circumferential direction by said first groove; and undivided circumferential portions each having a semicircular shape in section, and each of said undivided circumferential portions being positioned on said inner surface of said shaft hole within one of said legs of said fitting portion, wherein a pitch diameter of said undivided circumferential portions is slightly smaller than that of the aiming screw.

7. The self-locking nut according to claim 6, wherein said self-locking nut is made from resin.

8. The self-locking nut according to claim 6, said threaded portion further comprising second grooves positioned perpendicular to said slit of said fitting portion, wherein said divided circumferential portion is divided in the circumferential direction by said first and second grooves.

9. An aiming adjustment device for adjusting an optical axis of a vehicular lamp, comprising:

an aiming screw having a threaded shaft, said aiming screw being rotatably supported by a lamp body;

a bracket formed on a reflector of the lamp; and a self-locking nut fitted in a hole formed in said bracket, said self-locking nut being engageable with the threaded shaft of said aiming screw, said self-locking nut comprising:

a body for receiving said aiming screw;

a fitting portion formed below said body, for fitting into the hole in said bracket, wherein said fitting portion comprises a pair of legs, each of said legs having a wedge shape, and said pair of legs being elastically expandable;

a shaft hole having an inner surface, said shaft hole passing through said body and said fitting portion in a vertical direction;

a threaded portion formed on the inner surface of said shaft hole, for engaging with said aiming screw, said threaded portion comprising, a groove extending along said inner surface of said shaft hole from said fitting portion through said body;

a divided circumferential portion divided in a circumferential direction thereof by said groove; and an undivided circumferential portion having a circular shape in section disposed below said groove, wherein said threaded portion is undivided in the circumferential direction by said groove.

10. The aiming adjustment device according to claim 9, wherein said self-locking nut is made from resin.

11. The aiming adjustment device according to claim 9, wherein a pitch diameter of said undivided circumferential portion is slightly smaller than that of said aiming screw.

12. The aiming adjustment device according to claim 11, wherein said undivided circumferential portion is arranged at said fitting portion.

13. The aiming adjustment device according to claim 9, wherein said threaded portion has plural grooves for dividing the divided circumferential portion.

* * * * *